US010310185B1

(12) United States Patent
Lin et al.

(10) Patent No.: US 10,310,185 B1
(45) Date of Patent: Jun. 4, 2019

(54) TE POLARIZER BASED ON SOI PLATFORM

(71) Applicant: INPHI CORPORATION, Santa Clara, CA (US)

(72) Inventors: Jie Lin, Santa Clara, CA (US); Masaki Kato, Palo Alto, CA (US)

(73) Assignee: INPHI CORPORATION, Santa Clara, CA (US)

( * ) Notice: Subject to any disclaimer, the term of this patent is extended or adjusted under 35 U.S.C. 154(b) by 0 days.

(21) Appl. No.: 16/033,074

(22) Filed: Jul. 11, 2018

(51) Int. Cl.
*G02B 6/27* (2006.01)
*G02B 6/126* (2006.01)
*G02B 6/12* (2006.01)

(52) U.S. Cl.
CPC ............ *G02B 6/276* (2013.01); *G02B 6/126* (2013.01); *G02B 2006/12061* (2013.01); *G02B 2006/12116* (2013.01)

(58) Field of Classification Search
None
See application file for complete search history.

(56) References Cited

U.S. PATENT DOCUMENTS

| 4,911,513 A * | 3/1990 | Valette | G02B 6/126 385/11 |
| 6,169,825 B1 * | 1/2001 | Morey | G02B 6/126 385/11 |
| 2013/0071060 A1 * | 3/2013 | Kim | G02B 6/00 385/11 |
| 2014/0270628 A1 * | 9/2014 | Barwicz | G02B 6/126 385/14 |
| 2017/0075063 A1 * | 3/2017 | Brouckaert | G02B 6/126 |

OTHER PUBLICATIONS

Y. Xu et al. A compact TE-pass polarizer for silicon-based slot waveguides. IEEE Photonics Technology Letters, 27:19:2071-2074, Oct. 1, 2015. (Year: 2015).*

* cited by examiner

*Primary Examiner* — Michael Stahl
(74) *Attorney, Agent, or Firm* — Richard T. Ogawa

(57) ABSTRACT

The present application discloses a Transverse Electric (TE) polarizer. The TE polarizer includes a silicon-on-insulator substrate having a silicon dioxide layer. The TE polarizer further includes a waveguide embedded in the silicon dioxide layer. Additionally, the TE polarizer includes a plate structure embedded in the silicon dioxide layer substantially in parallel to the waveguide with a gap distance. In an embodiment, the plate structure induces an extra transmission loss to a Transverse Magnetic (TM) mode in a light wave traveling through the waveguide.

20 Claims, 4 Drawing Sheets

G9=G1>G10=G2>G11=G3>G12=G4

Gap (G): G13>G14>G15    G16≈G13>G17≈G14>G18≈G15

G19≈G13>G20≈G14>G21≈G15

TE POLARIZER BASED ON SOI PLATFORM

BACKGROUND OF THE INVENTION

The present invention relates to a silicon-photonics device. More particularly, the present invention provides a compact Transverse Electric (TE) polarizer based on silicon-on-insulator (SOI) platform, a method of making the TE polarizer, and a silicon-photonics circuit integrated with the TE polarizer for wide band communication in DWDM system.

Over the last few decades, the use of broadband communication networks exploded. In the early days Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

Large-scale photonic integrated circuits are becoming very promising for many applications, including next-generation optical networks, optical interconnects, dense wavelength division multiplexed (DWDM) systems, coherent transceivers, lab-on-chip, etc. Silicon-based photonics integrated circuits have also become very popular, because of their compatibility with mature CMOS (complementary metal-oxide-semiconductor) technologies with excellent processing control, low cost and high volume processing. Furthermore, silicon-on-insulator (SOI) is widely used as substrates for making various silicon-photonics devices. It is well known that SOI waveguides are usually severely polarization-sensitive so that many polarization handling devices including integrated optical polarizer have become very important components in polarization sensitive Si Photonics Circuit.

For example, a compact polarizer made by a simple and high tolerance in process on SOI substrate and easy being integrated with other silicon-photonics devices becomes a crucial component for Dense Wavelength Division Multiplexing (DWDM) in C-band or O-band. Prior approaches of making the polarizer for silicon-photonics are mostly process intolerant, complicated, dimension sensitive, or hard to be integrated with other silicon-photonics devices.

Therefore, it is desired to develop improved compact, simple, process-robust TE polarizer for easy integrating in silicon-photonics circuit for wide band DWDM application.

BRIEF SUMMARY OF THE INVENTION

The present invention relates to photonic broadband communication device. More particularly, the present invention provides a compact Transverse Electric (TE) polarizer based on silicon-on-insulator (SOI) platform, a method of making the TE polarizer, and a silicon-photonics circuit integrated with the TE polarizer for wide band communication in DWDM system. The TE polarizer based on SOI platform can be integrated within a silicon-photonics system in wide band DWDM communication application, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increasing due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a Transverse Electric (TE) polarizer. The TE polarizer includes a silicon-on-insulator substrate having a silicon dioxide layer. The TE polarizer further includes a waveguide embedded in the silicon diode layer. Additionally, the TE polarizer includes a plate structure embedded in the silicon dioxide layer substantially in parallel to the waveguide with a gap distance. The plate structure induces an extra transmission loss to a Transverse Magnetic (TM) mode in a light wave traveling through the waveguide.

In an alternative embodiment, the present invention provides a method for forming a Transverse Electric (TE) polarizer. The method includes providing a silicon-on-insulator substrate having a silicon dioxide layer. Additionally, the method includes forming a waveguide embedded in the silicon diode layer. Furthermore, the method includes forming a plate structure embedded in the silicon dioxide layer substantially in parallel to the waveguide with a gap distance. Dimensions of the waveguide and the plate structure and the gap distance between them are tuned to induce an extra transmission loss to a Transverse Magnetic (TM) mode in a light wave traveling through the waveguide greater than a first target loss for all wavelengths in a band and a transmission loss of Transverse Electric (TE) mode in the light wave is smaller than a second target loss for all wavelengths in the band.

In another alternative embodiment, the present invention provides a silicon-photonics circuit including the TE polarizer integrated with a DWDM system. Optionally, the TE polarizer can be inserted in the silicon-photonics circuit without disturbing the circuit layout. Optionally, the TE polarizer can be configured to different length according to the extinction ratio requirement in particular application.

Many benefits of the TE polarizer can be achieved with the present invention based on SOI platform. As an example, the SOL platform is fully compatible with CMOS technology, which substantially simplifies the process of making the TE polarizer itself as well as integrated it with other silicon-photonics devices flexibly. High tolerance in material selection and dimensions under a same scope of a simple manufacture process allows the TE polarizer to be tuned to provide different scaled distinction ratio with different compact sizes for wide range of wavelengths either in C-band or O-band for polarization sensitive DWDM communication system.

The present invention achieves these benefits and others in the context of disclosed Transverse Electric (TE) polarizer based on a SOI substrate. A further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

Figure 1:
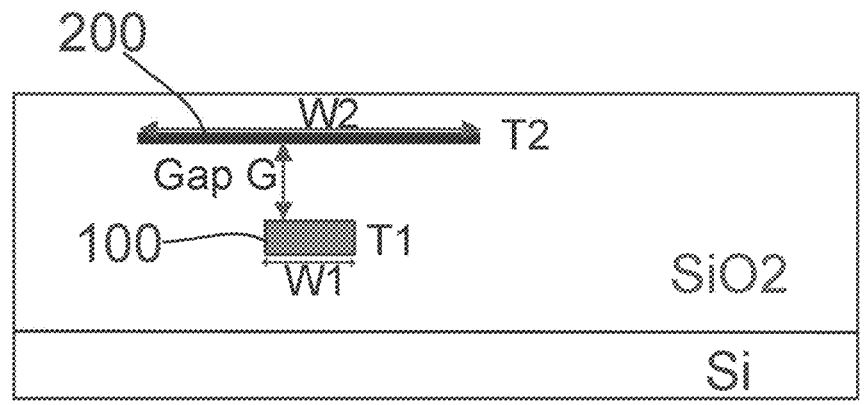
FIG. 1 is a simplified cross sectional view of a TE polarizer based on SOI platform according to an embodiment of the present invention.

The present invention relates to photonic broadband communication device. More particularly, the present invention provides a compact Transverse Electric (TE) polarizer based on silicon-on-insulator (SOI) platform and a method of making the TE polarizer, and a silicon-photonics circuit integrated with the TE polarizer for wide band communication in DWDM system. The TE polarizer based on SOI platform can be integrated within a silicon-photonics system in wide band DWDM communication application, though other applications are possible.

Compact, simple and process tolerant TE polarizer based on silicon-on-insulator (SOI) is crucial element for handling polarization sensitive optical transmission of Dense Wavelength Division Multiplexing (DWDM) light wave in C-band or O-band through silicon-photonics circuit. Several existing TE polarizer products have different kinds of drawbacks. For example, a TE polarizer based on shallow-etched SOI ridge waveguide or engineered waveguides leaking unwanted mode to Si substrate has issues being process intolerant. Subwavelength grating Si waveguide polarizer or hybrid plasmonic Bragg grating based polarizer has very complicated grating process. Photonic crystals based polarizer also needs grating and hard to be integrated with other silicon-photonics circuits. A Graphene assisted polarizer based on Mach-Zehnder Refractometer (MZR) needs extra material system involved and not very compatible with existing CMOS-based silicon-photonics process. Waveguide bends polarizer is compatible with silicon-photonics process but highly dimension sensitive.

This invention provides a SiN/Si based, simple, and robust polarizer design in C-band or O-band for integration with silicon-photonics circuits. There is no extra process step needed other than standard CMOS process. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

FIG. 1 is a simplified cross sectional view of a TE polarizer based on SOI platform according to an embodiment of the present invention. This diagram is merely an example, which should not unduly limit the scope of the claims. One of ordinary skill in the art would recognize many variations, alternatives, and modifications. As shown, a silicon-on-insulator substrate is provided on which many CMOS processes can be performed for forming various photonics elements including waveguides embedded in a silicon dioxide layer. Referring to FIG. 1, a silicon dioxide layer SiO2 is overlying a silicon layer Si, and a waveguide 100 is formed with a cross-sectional rectangular shape having a first width W1 and a first thickness T1. Optionally, the waveguide 100 has a first length (along a direction into the cross-section, not shown) embedded inside the silicon dioxide layer SiO2. Optionally, the first length can be an arbitrary value depending on applications. Optionally, the waveguide is made with semiconducting characteristics. Optionally, the semiconducting characteristics include polarization sensitive birefringence. Optionally, the semiconducting characteristics are provided by a material of silicon, i.e., the waveguide 100 is a Si waveguide. Optionally, the semiconducting characteristics are provided by a material of silicon nitride, i.e., the waveguide 100 is a SiN waveguide. Optionally, the waveguide 100 is made by a standard SiN/Si on SOI single mode waveguide process compatible with CMOS process without extra waveguide engineering.

In the embodiment, referring to FIG. 1, a plate structure 200 is formed with a second width W2 and a second thickness T2 as shown in the cross sectional view. Additionally, the plate structure 200 is formed substantially in parallel to the waveguide 100 with a gap distance G. Optionally, the plate structure 200 is fully embedded in the silicon dioxide layer SiO2 with a second length (not explicitly shown) being equal to or smaller than the first length of the waveguide 100. Optionally, the plate structure 200 is made with metallic characteristics. Optionally, the metallic characteristics are provided by a material of metal nitride. In an example, the material is Titanium Nitride TiN. In an embodiment, a CMOS foundry TiN deposition process is used for forming the structure. Other metallic materials are possible replacement for making the plate structure 200.

In an embodiment, the structure with a cross section shown in FIG. 1 and a length equal to the first length of the waveguide 100 forms a TE polarizer. The TE polarizer is configured to have the waveguide 100 of the first length to contain a light wave with primarily TE mode polarization received at one end of the waveguide 100 and to induce extra loss to TM mode by the plate structure 200 of the second length at a gap distance away from the waveguide 100 so that the light wave is outputted at the other end with TE-mode in higher extinction ratio. In fact, the TM mode confinement in the SiN/Si single mode waveguide with semiconducting characteristics is less tighter than TE mode. TiN plate structure with metallic characteristics causes much higher absorbing loss to the TM mode of the light wave through the SiN/Si waveguide due to the evanescent tail.

In an embodiment, the TE polarizer disclosed in this invention is substantially wavelength insensitive for being integrated in wide band silicon-photonics circuits. It can be inserted in a silicon-photonics circuit without disturbing the circuit layout and causing process incompatibility. In an embodiment, the structure shown in FIG. 1 can be flexibly tuned to optimize shapes and dimensions of the waveguide 100 and plate structure 200 to achieve desired TE mode extinction ratio with transmission loss in TE mode being minimized for a wide band of wavelengths.

Figure 2:
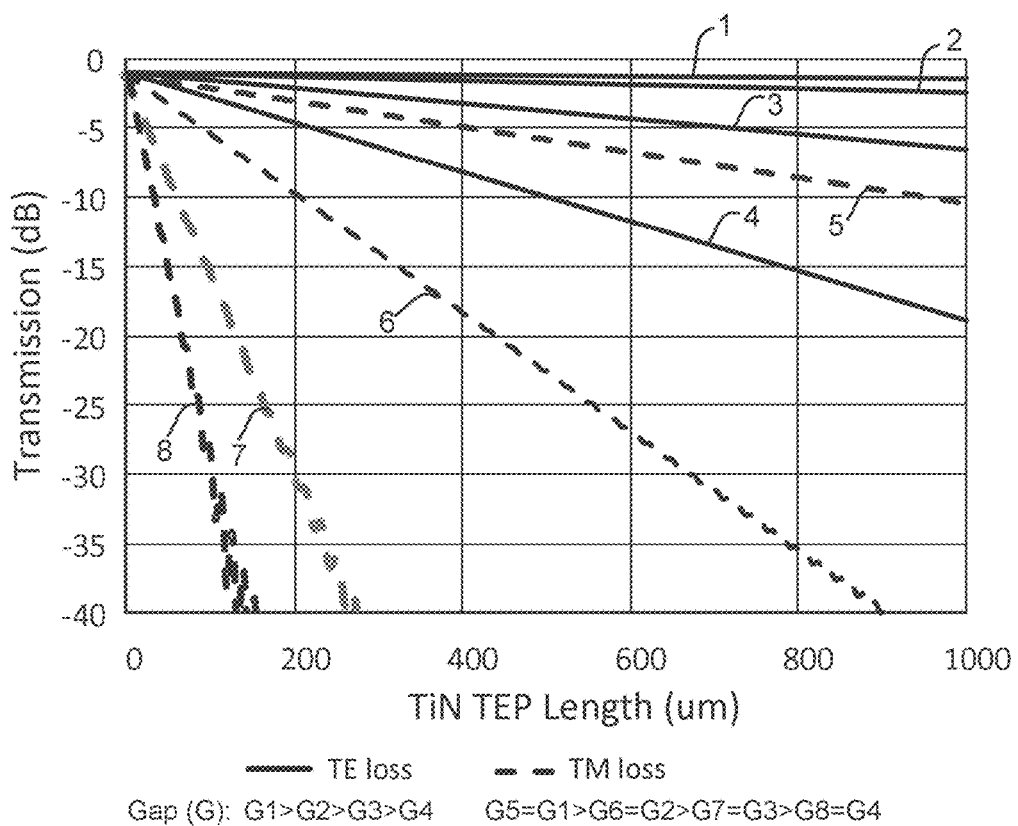
FIG. 2 is an exemplary diagram of optical transmission loss versus length of a plate structure with different gap distances from a SiN waveguide to provide extra loss to Transverse Magnetic mode of a light wave traveling through the waveguide according to some embodiments of the present invention.

FIG. 2 is an exemplary diagram of optical transmission loss versus length of a plate structure with different gap distances from a waveguide to provide extra loss to TM mode of a light wave traveling through the waveguide according to some embodiments of the present invention. Referring to FIG. 2, the TE polarizer is optimized by tuning the length (particularly the second length of a plate structure) and the gap distance between the plate structure and the waveguide. In this example, the TE polarizer includes a SiN waveguide 100 and a TiN plate structure 200 at a gap distance G. Optionally, the second length of the TiN plate structure 200 disposed at a gap distance G away from the SiN waveguide 100 is substantially the same as the first length of the waveguide 100, i.e., the length of the TE polarizer. Curves 1 and 5 are respective transmission loss for TE mode and TM mode at a gap distance of a first value G1 (or G5=G1) for the TE polarizer length varied from 0 to 1000 μm. Curves 2 and 6 are respective transmission loss for TE mode and TM mode at a gap distance of a second value G2 (or G6=G2) for the TE polarizer in the same length range. Here G2 (or G6) is smaller than G1 (or G5). Curves 3 and 7 are respective transmission loss for TE mode and TM mode at a gap distance of a third value G3 (or G7=G3) for the TE polarizer in the same length range. Here G3 (or G7) is smaller than G2 (or G6). Curves 4 and 8 are respective transmission loss for TE mode and TM mode at a gap distance of a fourth value G4 (or G8=G4) for the TE polarizer in the same length range. Here G4 (or G8) is smaller than G3 (or G7).

In a specific example shown in FIG. 2, the TE polarizer is provided with a SiN waveguide 100 being given a width of 0.7 μm and a thickness of 0.4 μm, and a TiN plate structure 200 being given a width of 2 μm and a thickness of 0.1 μm. The gap distance is selected as following, G1=G5=1.4 μm; G2=G6=1.05 μm; G3=G7=0.75 μm; and G4=G8=0.5 μm. Referring to FIG. 2, for gap distance G1=G5=1.4 μm; G2=G6=1.05 μm, the transmission loss for TE mode is very small (<2 dB) for all different length values of the TE polarizer up to 1000 μm. More specifically, the loss is slightly increases as the length increases. But the transmission loss for TM mode increases very fast as the length increases. For gap distance G3=G7=0.75 μm; and G4=G8=0.5 μm, the transmission loss for TE mode increases too fast with increasing length value, not preferable for the TE polarizer.

Figure 3:
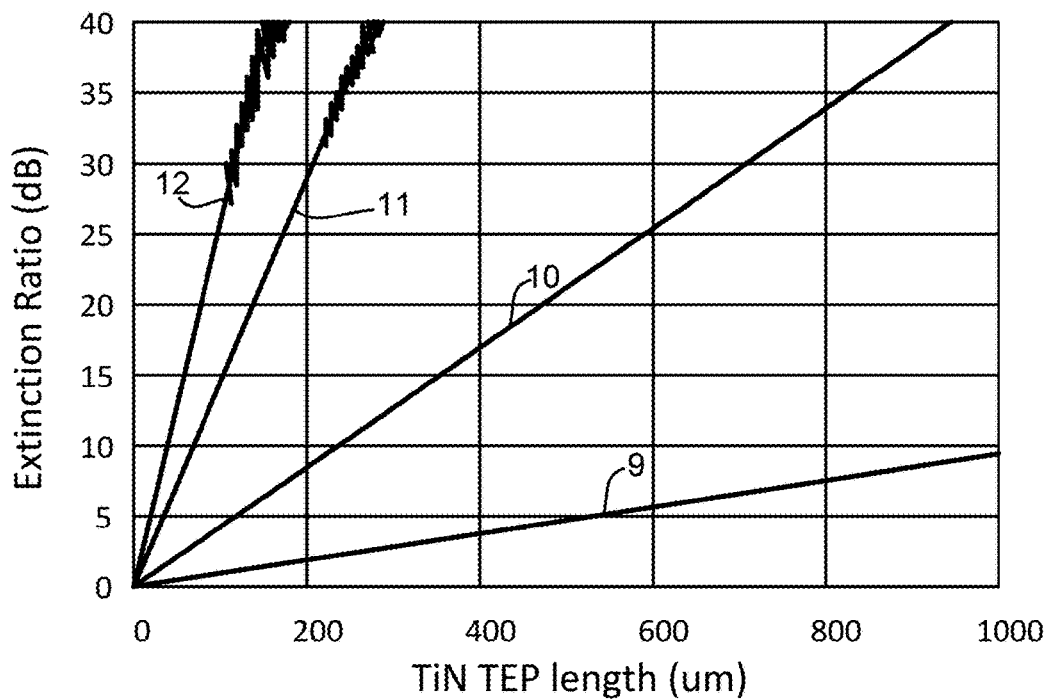
FIG. 3 is an exemplary diagram of polarization extinction ratio versus length of a plate structure with different gap distances from a SiN waveguide to provide extra loss to Transverse Magnetic mode of a light wave traveling through the waveguide according to some embodiments of the present invention.

FIG. 3 is an exemplary diagram of polarization extinction ratio versus length of a plate structure with different gap distances from a waveguide to provide extra loss to TM mode of a light wave traveling through the waveguide according to some embodiments of the present invention. Referring to FIG. 3, curves 9, 10, 11, and 12 are respective variations of extinction ratio (ER) versus length up to 1000 μm of the TE polarizer for four different selections of gap distance G, 1.4 μm, 1.05 μm, 0.75 μm, and 0.5 μm. ER is found to be substantially linearly proportional to the length of the TE polarizer (specifically the length of TiN plate structure embedded in the silicon dioxide layer). For example, for G2=1.05 μm, a TE polarizer with a length of 250 μm yields an ER>10 dB for TE/TM mode through the waveguide. In another example, for G1=1.4 μm, a TE polarizer of 200 μm yields an ER~2 dB for TE/TM mode through the waveguide.

Figure 4:
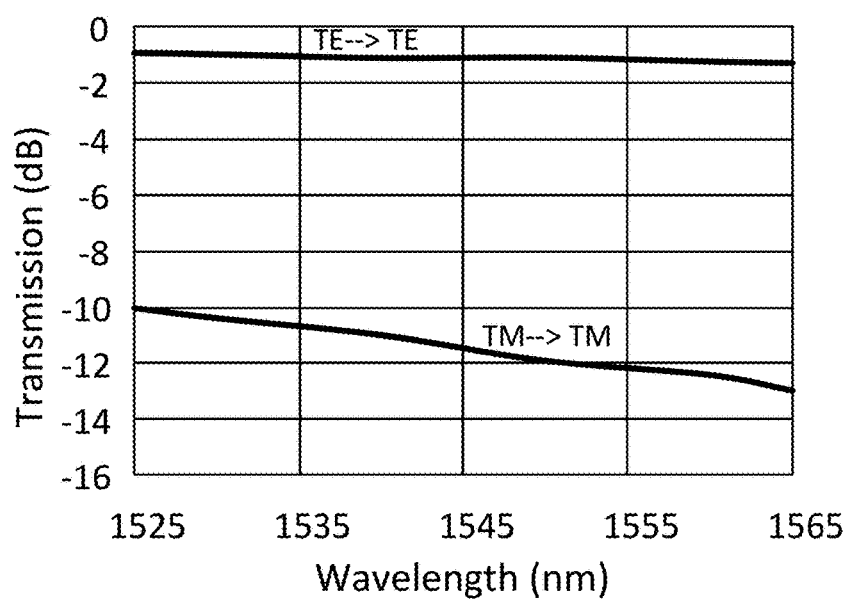
FIG. 4 is an exemplary plot of transmission loss for all wavelengths in C-band from 1525 nm to 1565 nm in TE mode and TM mode through the SiN waveguide according to an embodiment of the present invention.

FIG. 4 is an exemplary plot of transmission loss for all wavelengths in C-band from 1525 nm to 1565 nm in TE mode and TM mode through the waveguide according to an embodiment of the present invention. For a specifically given dimensions of a TE polarizer described herein with a gap distance G=1.05 μm and the length of TiN plate structure, the transmission losses through the SiN waveguide for TE mode as well as for TM mode are plotted for all wavelengths in a wide band from 1525 nm to 1565 nm. This is fairly desired TE polarizer for C-band with TE loss smaller than 1 dB very much independent of the wavelength while yielding TM loss greater than 10 dB yet still very insensitive to variation of the wavelength.

Figure 5:
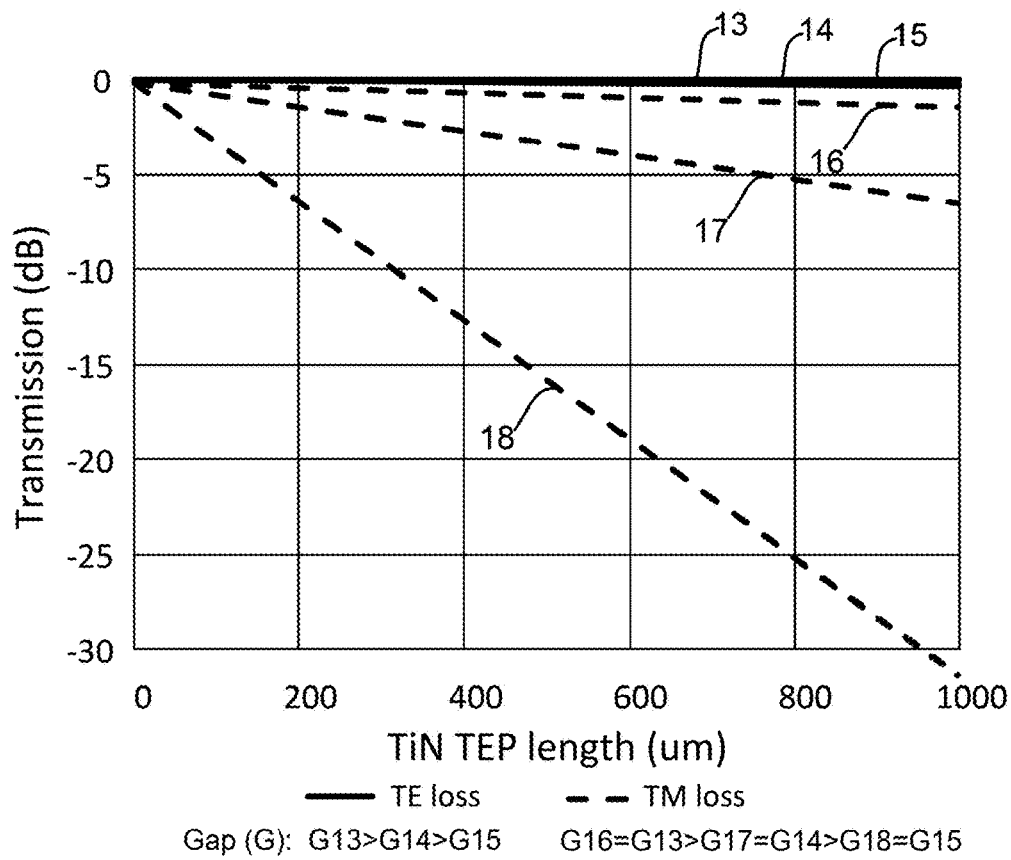
FIG. 5 is an exemplary diagram of optical transmission loss versus length of a plate structure with different gap distances from a Si waveguide to provide extra loss to Transverse Magnetic mode of a light wave traveling through the waveguide according to some alternative embodiments of the present invention.

In another embodiment, the TE polarizer includes a Si waveguide 100 and a TiN plate structure 200 at a gap distance G. Optionally, the second length of the TiN plate structure 200 disposed at a gap distance G away from the SiN waveguide 100 is substantially the same as the first length of the waveguide 100, i.e., the length of the TE polarizer. FIG. 5 is an exemplary diagram of optical transmission loss versus length of a plate structure with different gap distances from a waveguide to provide extra loss to Transverse Magnetic mode of a light wave traveling through the waveguide according to some alternative embodiments of the present invention. Curves 13 and 16 are respective transmission loss for TE mode and TM mode at a gap distance of a first value G13 (or G16=G13) for the TE polarizer length varied from 0 to 1000 µm. Curves 14 and 17 are respective transmission loss for TE mode and TM mode at a gap distance of a second value G14 (or G17=G14) for the TE polarizer in the same length range. Here G14 (or G17) is smaller than G13 (or G16). Curves 15 and 18 are respective transmission loss for TE mode and TM mode at a gap distance of a third value G15 (or G18=G15) for the TE polarizer in the same length range. Here G15 (or G18) is smaller than G14 (or G17).

In a specific example shown in FIG. 5, the TE polarizer is provided with a Si waveguide 100 being given a width of 0.45 µm and a thickness of 0.22 µm, and a TiN plate structure 200 being given a width of 2 µm and a thickness of 0.1 µm. The gap distance is selected as following, G13=G16=1.0 µm; G14=G17=0.8 µm; and G15=G18=0.6 µm. Referring to FIG. 5, for all three choices of gap distance, the TE losses are all very small for the length of TE polarizer up to 1000 µm. At the same time, the TM losses become fairly large (>5 dB at length of −800 µm) for G14=G17=0.8 µm and even bigger (>10 dB at length of −300 µm) for G15=G18=0.6 µm.

Figure 6:
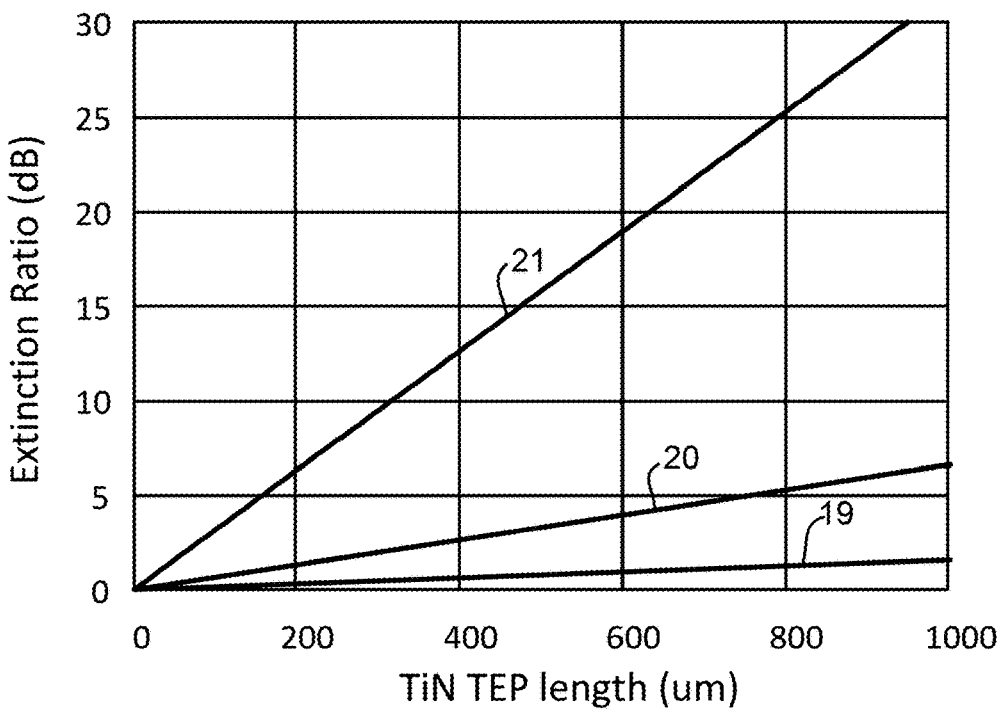
FIG. 6 is an exemplary diagram of polarization extinction ratio versus length of a plate structure with different gap distances from a Si waveguide to provide extra loss to Transverse Magnetic mode of a light wave traveling through the waveguide according to some alternative embodiments of the present invention.

FIG. 6 is an exemplary diagram of polarization extinction ratio versus length of a plate structure with different gap distances from a waveguide to provide extra loss to Transverse Magnetic mode of a light wave traveling through the waveguide according to some alternative embodiments of the present invention. FIG. 6 is an alternate plot of FIG. 5 to show that the extinction ratio of TE/TM for the light wave traveling through the Si waveguide 100 with a TiN plate structure 200 set aside. Curve 19 corresponds to a gap distance G19=G13=1.0 µm; Curve 20 corresponds to a smaller gap distance G20=G14=0.8 µm; and Curve 21 corresponds to an even smaller gap distance G21=G15=0.6 µm.

Figure 7:
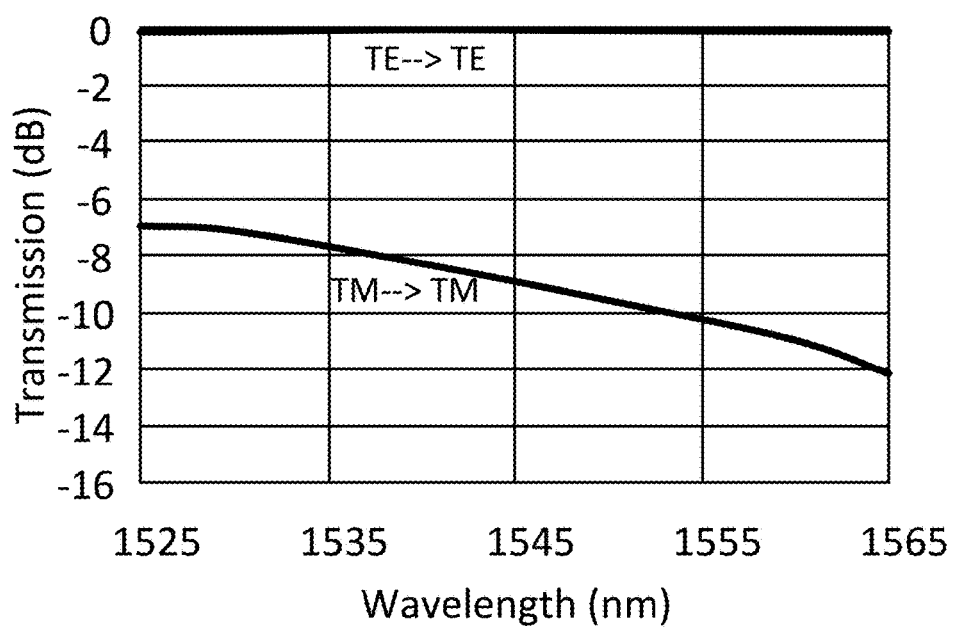
FIG. 7 is an exemplary plot of transmission loss for all wavelengths in C-band from 1525 nm to 1565 nm in TE mode and TM mode through the Si waveguide according to an alternative embodiment of the present invention.

FIG. 7 is an exemplary plot of transmission loss for all wavelengths in C-band from 1525 nm to 1565 nm in TE mode and TM mode through the waveguide according to an alternative embodiment of the present invention. For a specifically given dimensions of a TE polarizer described herein with a gap distance G=0.8 µm and the length of TiN plate structure, the transmission losses through the Si waveguide for TE mode as well as for TM mode are plotted for all wavelengths in a wide band from 1525 nm to 1565 nm. This is fairly desired TE polarizer for C-band with TE loss smaller than 1 dB very much independent of the wavelength while yielding TM loss greater than 7 dB yet very much insensitive to variation of the wavelength.

In another aspect, the present disclosure provides a method of making a TE polarizer based on SOI platform. Referring to FIG. 1, the method includes providing a silicon-on-insulator substrate having a silicon dioxide layer SiO2 (on top of a silicon layer Si). The SOI substrate is commonly used for fabrication and integration of silicon-photonics circuits to form various kinds of SiPho devices for applications including data communication in a DWDM system with wide band wavelengths. Particularly, TE polarizer is a widely used device in polarization sensitive Si Photonics Circuit. Additionally, the method includes forming a waveguide embedded in the silicon diode layer and forming a plate structure embedded in the silicon dioxide layer substantially in parallel to the waveguide with a gap distance. These processes are fully compatible to existing CMOS-based process for making silicon-photonics circuits on the SOI substrate without complicate waveguide engineering. The plate structure, which may be based on TiN or other materials with metallic characteristics, also can be made by COMS foundry (TiN) deposition process.

In an embodiment, the method is implemented by tuning dimensions of the waveguide and the plate structure and the gap distance between them to optimize the performance of the TE polarizer. In particular, the method includes using the plate structure to induce an extra transmission loss to a Transverse Magnetic (TM) mode in a light wave traveling through the waveguide greater than a first target loss for all wavelengths in a band and a transmission loss of Transverse Electric (TE) mode in the light wave is smaller than a second target loss for all wavelengths in the band.

In an embodiment, the step of forming of the waveguide includes forming a first length and a rectangular shaped cross section having a first width and a first thickness using a material with semiconducting characteristics. Optionally, the semiconducting characteristics include material of silicon or silicon nitride or other materials compatible with silicon-photonics process.

In the embodiment, the step of forming of the plate structure includes forming a second length, a second width, and a second thickness using a material with metallic characteristics. Additionally, the step includes optimizing the gap distance between the plate structure and the waveguide. Further the step includes optimizing the second length, which can be smaller than or equal to the first length. Optionally the second width is set to be greater than the first width and the second thickness is set to be smaller than the first thickness.

In the embodiment, the step of optimizing of the gap distance includes making that the transmission loss of the Transverse Magnetic (TM) mode in the light wave for all wavelengths in C band from 1525 nm to 1565 nm is greater than the first target loss selected from 5 dB, 7 dB, 10 dB, and 12 dB and the transmission loss of Transverse Electric (TE) mode in the light wave for all wavelengths in C band is smaller than the second target loss selected from 2 dB, 1.5 dB, 1 dB, 0.5 dB.

Optionally, the method further includes increasing the second length from a value of smaller than 200 µm, smaller than 250 µm, smaller than 300 µm, smaller than 500 µm, smaller than 750 µm, smaller than 1 mm to decide a practical length of a TE polarizer that yields a proper extinction ratio for specific applications. Optionally, the length of the TE polarizer is a substantially linearly proportion to the extinction ratio.

In yet another aspect, the present disclosure provides a silicon-photonics circuit for DWDM communication system containing the Transverse Electric polarizer based on SOI platform. Optionally, the silicon-photonics circuit includes passive components like multiplexer or demultiplexer, polarization rotator, polarization splitter, etc. Optionally, the silicon-photonics circuit includes components like modulator, coupler, phase shifter etc. that are coupled to active devices (laser or photodetector) for transmitting or receiving optical signals in a wide band. Optionally, the wide band can be C-band from 1525 nm to 1565 nm. Optionally, the wide band can be 0-band from 1270 nm to 1330 nm. The TE polarizer described herein can be optimized to have a transmission loss of Transverse Magnetic (TM) mode in the light wave for all wavelengths in the O-band to be greater than a first target loss and a transmission loss of Transverse Electric (TE) mode in the light wave for all wavelengths in the band to be smaller than a second target loss. Optionally, the first target loss is selected from one of 5 dB, 7 dB, 10 dB, and 12 dB for all wavelengths in O-band from 1270 nm to 1330 nm and the second target loss is selected from one of 2 dB, 1.5 dB, 1 dB, 0.5 dB for all wavelengths in the O-band. Optionally, the TE polarizer can be inserted in the silicon-photonics circuit without disturbing the circuit layout. Optionally, the TE polarizer can be configured to different length according to the extinction ratio requirement in particular application.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A Transverse Electric (TE) polarizer comprising:
   a silicon-on-insulator substrate having a silicon dioxide layer;
   a waveguide embedded in the silicon dioxide layer;
   a plate structure embedded in the silicon dioxide layer substantially in parallel to the waveguide with a gap distance;
   wherein the plate structure induces an extra transmission loss greater than 6 dB to a Transverse Magnetic (TM) mode while keeps a low transmission loss smaller than 2 dB to a Transverse Electric (TE) mode in a light wave of a bandwidth over 30 nm traveling through the waveguide.

2. The TE polarizer of claim 1, wherein the waveguide comprises a material which has semiconducting characteristics.

3. The TE polarizer of claim 2, wherein the material which has semiconducting characteristics comprises silicon.

4. The TE polarizer of claim 2, wherein the material which has semiconducting characteristics comprises silicon nitride.

5. The TE polarizer of claim 1, wherein the plate structure comprises a material which has metallic characteristics.

6. The TE polarizer of claim 5, wherein the material which has metallic characteristics comprises titanium nitride.

7. The TE polarizer of claim 1, wherein the waveguide comprises a first length and a rectangular shaped cross section having a first width and a first thickness.

8. The TE polarizer of claim 7, wherein the plate structure comprises a second length, a second width, and a second thickness, the second length being smaller than or equal to the first length, the second width being greater than the first width, and the second thickness being smaller than the first thickness.

9. The TE polarizer of claim 7, wherein the gap distance is optimized for given dimensions of the waveguide and the plate structure such that a transmission loss of Transverse Magnetic (TM) mode in the light wave for all wavelengths in a band is greater than a first target loss and a transmission loss of Transverse Electric (TE) mode in the light wave for all wavelengths in the band is smaller than a second target loss.

10. The TE polarizer of claim 9, wherein the first target loss comprises one of 7 dB, 10 dB, and 12 dB for all wavelengths in C-band from 1525 nm to 1565 nm and the second target loss comprises one of 2 dB, 1.5 dB, 1 dB, 0.5 dB for all wavelengths in the C-band.

11. The TE polarizer of claim 10, wherein the gap distance comprises a value in a range from 0.3 µm to 2 µm.

12. The TE polarizer of claim 10, wherein the second length comprises a value of smaller than 200 µm, smaller than 250 µm, smaller than 300 µm, smaller than 500 µm, smaller than 750 µm, smaller than 1 mm, yielding a substantially linearly increasing extinction ratio.

13. The TE polarizer of claim 9, wherein the first target loss comprises one of 7 dB, 10 dB, and 12 dB for all wavelengths in O-band from 1270 nm to 1330 nm and the second target loss comprises one of 2 dB, 1.5 dB, 1 dB, 0.5 dB for all wavelengths in the O-band.

14. A method for forming a Transverse Electric (TE) polarizer comprising:
    providing a silicon-on-insulator substrate having a silicon dioxide layer;
    forming a waveguide embedded in the silicon dioxide layer;
    forming a plate structure embedded in the silicon dioxide layer substantially in parallel to the waveguide with a gap distance;
    wherein dimensions of the waveguide and the plate structure and the gap distance between them are tuned to induce an extra transmission loss to a Transverse Magnetic (TM) mode in a light wave traveling through the waveguide greater than a first target loss of 6 dB for all wavelengths in a band over 30 nm and a transmission loss of Transverse Electric (TE) mode in the light wave is smaller than a second target loss of 2 dB for all wavelengths in the band over 30 nm.

15. The method of claim 14, wherein the forming of the waveguide comprises forming a first length and a rectangular shaped cross section having a first width and a first thickness using a material with semiconducting characteristics.

16. The method of claim 15, wherein the material with semiconducting characteristics comprises silicon.

17. The method of claim 15, wherein the material with semiconducting characteristics comprises silicon nitride.

18. The method of claim 15, wherein the forming of the plate structure comprises forming a second length, a second width, and a second thickness using a material with metallic characteristics, and optimizing the gap distance, the second length being smaller than or equal to the first length, the second width being greater than the first width, and the second thickness being smaller than the first thickness.

19. The method of claim 18, wherein the optimizing of the gap distance comprises making that the transmission loss of the Transverse Magnetic (TM) mode in the light wave for all wavelengths in C band from 1525 nm to 1565 nm is greater than the first target loss selected from 7 dB, 10 dB, and 12 dB and the transmission loss of Transverse Electric (TE) mode in the light wave for all wavelengths in C band is smaller than the second target loss selected from 2 dB, 1.5 dB, 1 dB, 0.5 dB.

20. The method of claim 19, further comprising increasing the second length from a value of smaller than 200 µm, smaller than 250 µm, smaller than 300 µm, smaller than 500 µm, smaller than 750 µm, smaller than 1 mm, yielding a substantially linearly increasing extinction ratio.

* * * * *